H. H. THAYER.

Journal Boxes.

No. 5,323

Reissued March 11, 1873.

Witnesses, Harry Smith
Thomas McIlvain,

Harlow H. Thayer
by his Attys
Howson and Son.

UNITED STATES PATENT OFFICE.

HARLOW H. THAYER, OF SANDWICH, MASSACHUSETTS, ASSIGNOR OF ONE-HALF INTEREST TO JAS. A. WOODBURY.

IMPROVEMENT IN JOURNAL-BOXES.

Specification forming part of Letters Patent No. 21,474, dated September 7, 1858; extended seven years; reissue No. 5,323, dated March 11, 1873.

*To all whom it may concern:*

Figure 1:
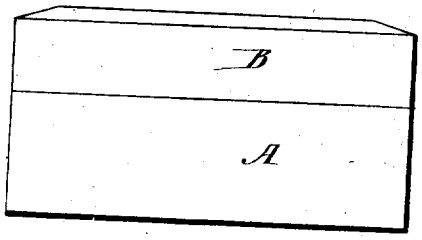
Figure 2:
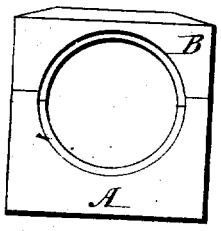
Figure 3:
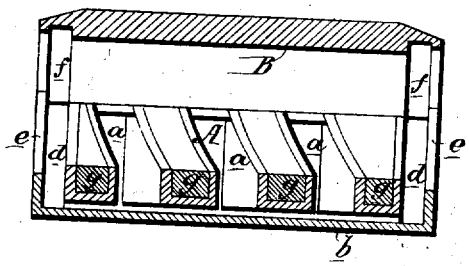
Figure 4:
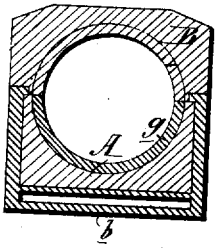
Figure 5:
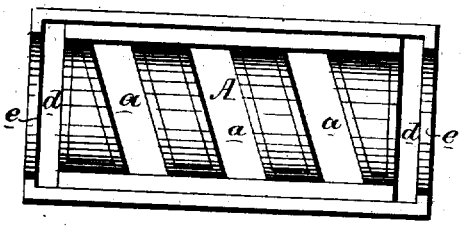
Figure 6:
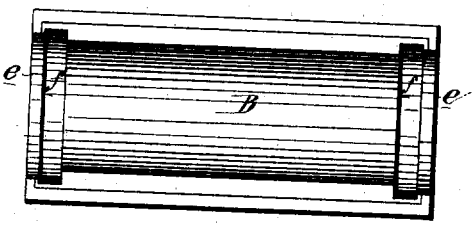

Be it known that I, HARLOW H. THAYER, of Sandwich, county of Barnstable, State of Massachusetts, have invented an Improvement in Journal-Boxes, of which the following is a specification:

Figure 1 is a side elevation; Fig. 2, an end view; Fig. 3, a longitudinal section; Fig. 4, a transverse section, of the said box. Fig. 5 is a top view of the lower half or journal-bearing part. Fig. 6 is an under-side view of the cap.

A denotes the lower portion of the box, and B is the cap thereof, the said lower portion having a series of lubricating-chambers, *a a a*, each of which extend upward from an oil-trough, *b*, arranged in the lower part of the box, as shown in the drawing. The several chambers *a a a* are to contain lubricators, or cotton-wicking, sponge, or other suitable material capable of absorbing oil, in order that such material, when saturated with oil, may lubricate the journal as it revolves in the box, the chambers *a a* being so arranged as to cause nearly all, if not the entire, surface of the journal to be lubricated during each revolution of the journal. At each end of the lower portion A of the box there is a vertical chamber, *d*, which communicates freely with the oil-trough *b* and has a circular opening, *e*, formed in it and the cap of the box, this opening being made somewhat larger in diameter than the journal, in order that there may be a space between the two such as will prevent oil from the journal from being removed from the edge of the opening and running from the same down upon the outer surface of the end of the lower portion A of the box. Immediately over each of the chambers *d*, and in rear of the opening *e*, the cap B is grooved as shown at *f*, such groove being extended entirely across the cap for the purpose of intercepting the oil that may pass beyond the end of the outer bearing-surface *g*. This groove also serves to conduct such oil into the chamber *d*. If desirable, each of the bearing-surfaces *g g* of the lower portion A of the box may be chambered or recessed and "Babbitted" or filled with an anti-friction composition of material.

It will be obvious that as the journal revolves within the box its surface will be lubricated by the sponge or wicking or lubricator of the chambers *a a a*; also, that the amount of surface so lubricated will depend very much on the width of each chamber and its angular position with reference to the side of the box or to the axis of the journal. The less the angle of inclination of the chamber to the side of the box the greater will be the amount of surface of the journal lubricated by the oily material within the chamber. Such oil as may pass beyond the bearing-surface in a longitudinal direction will be received into one of the intercepting-chambers *d* and thence will pass into the trough *b*, from whence it will be again absorbed by the capillary sponge or wicking in the chambers *a a a*.

Thus, by my invention, a constant circulation of the oil from the trough to the journal, and from the latter to the former, will be taking place while the journal is in rotation, nearly all, if not the entire, surface of the journal being thoroughly lubricated at the same time.

I claim as my invention—

1. In a journal-box, the combination, substantially as described, of the lubricating-chamber *a* and bearing-surfaces *g* with the channel or trough *b* below the same.

2. The combination, substantially as described, of the intercepting-chamber *d* at each end of the box with the oil-trough *b*.

3. The openings *e* in the ends of the box made larger than the journal, as and for the purpose set forth.

4. The combination of the chamber *d* in the lower portion of the box with the groove *f* in the cap of the same.

5. The combination of inclined bearing-surfaces *g* with the inclined lubricating-chambers *a*.

In testimony whereof I have signed my name to this specification in the presence of two subscribing witnesses.

HARLOW H. THAYER.

Witnesses:

E. F. WOODBURY,

P. E. TUCKER.